Figure 1:
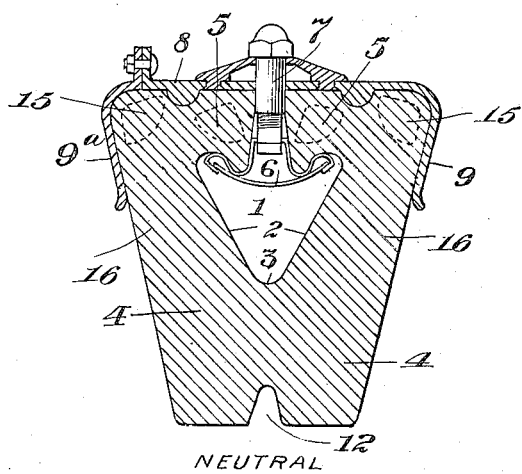
Figure 2:
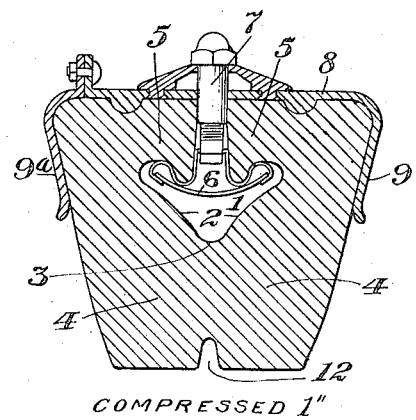
Figure 3:
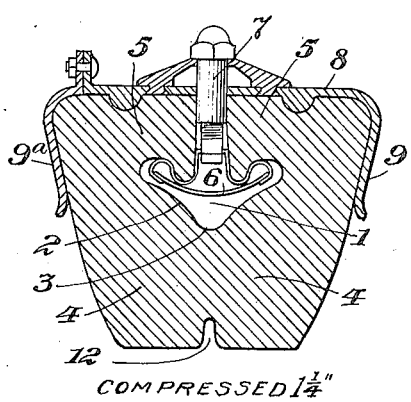
Figure 4:
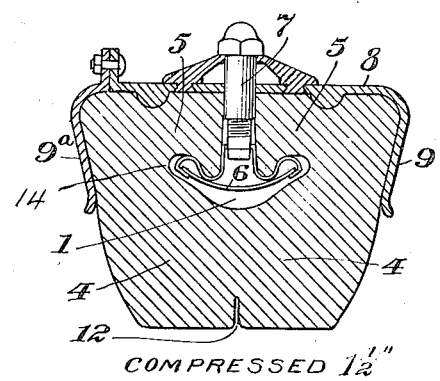

M. C. OVERMAN.
VEHICLE TIRE.
APPLICATION FILED DEC. 16, 1910.

1,092,078.

Patented Mar. 31, 1914.
2 SHEETS—SHEET 1.

NEUTRAL

COMPRESSED 1"

COMPRESSED 1¼"

COMPRESSED 1½"

WITNESSES
Edna A. Moreland
Alan C. McDonnell

INVENTOR
Max Cyrus Overman
BY
E. W. Scherr Jr.
ATTORNEY

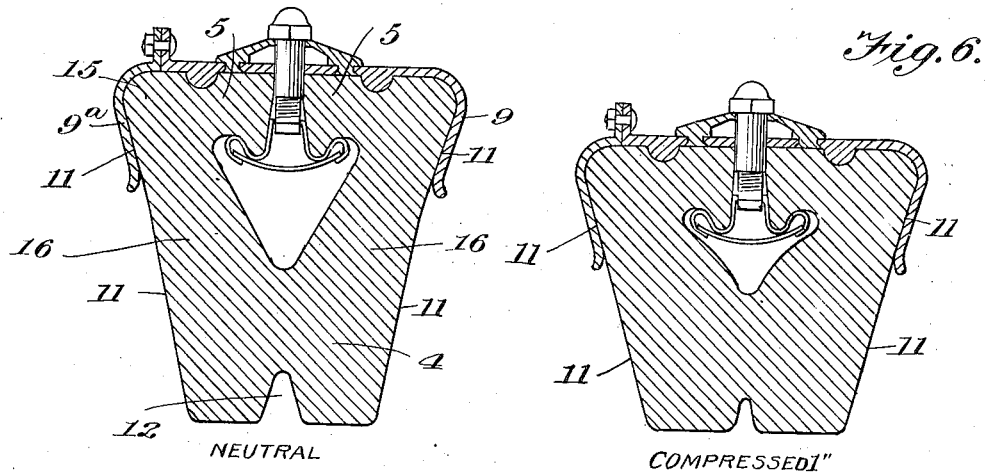
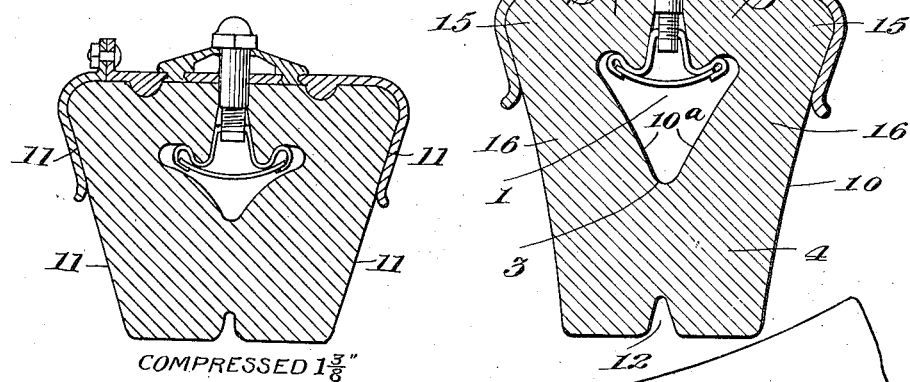
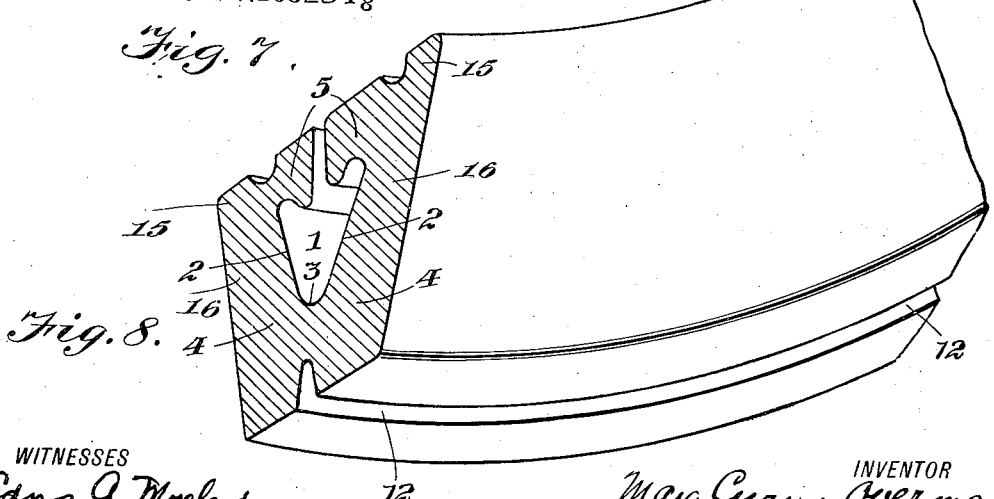

UNITED STATES PATENT OFFICE.

MAX CYRUS OVERMAN, OF NEW YORK, N. Y.

VEHICLE-TIRE.

1,092,078.

Specification of Letters Patent.     Patented Mar. 31, 1914.

Application filed December 16, 1910. Serial No. 597,646.

*To all whom it may concern:*

Be it known that I, MAX CYRUS OVERMAN, citizen of the United States, residing at New York, in the county of New York and State of New York, have invented certain new and useful Improvements in Vehicle-Tires, of which the following is a specification.

For a cushion tire to have easy or pneumatic riding quality, it is necessary that its load-bearing side walls adjacent the tire opening shall project toward the tread well below the wheel flanges so as to be unconfined laterally and freely responsive to absorb shock, which they obviously are not if located wholly within the flange-space, or substantially so. My own tire belongs to this type with flange-free side walls, and I have discovered that the working requisites for this type consist in making its side walls do their work as far as possible by endwise, that is vertical compression of their material without bending or buckling action. Next, the material laterally displaced by the compression of the side walls should be compressed into the sides of the tire opening rather than reversely in the direction of or under the flanges,—because to do the latter to any great extent causes abrasion and wear of the tire at the flanges. My tire efficiently embodies these requisites but they have not been easy to attain because the side walls of a cushion tire of the flange-free type naturally tend, under working conditions, to bend outwardly, even to the extent of collapsing so that the outer sides of their lower portions bear on the ground. This results in a variety of defects, such as (1st) the distortion of the rubber into folds and bends and its excessive working or bending, leading to the quick destruction of the tire; (2d) the abrasion of the tire at the flanges; (3d) an inefficient load-carrying capacity; (4th) an inefficient shock absorption because of the unnecessarily great diminution in the depth of the tire under load; (5th) an inordinate increase in the width of the tread, causing an unnecessary drain on the engine power and an increased shock to the vehicle due to the increased road contact. My own tire construction has advantages corresponding to the reverse of these defects because I have so designed and devised the tire that all of its features combine to control these flange-free side walls and to compel them to do their work as far as possible by endwise, that is, vertical compression, with minimized lateral bending or buckling action,—and with the tendency for their laterally displaced material to fill into the tire opening rather than to mush outwardly under the flanges. These and other features and advantages of my invention will appear from an understanding of the following description in connection with the drawings, wherein I have shown only some of the preferred forms which my tire may take.

In the drawings, Figures 1 to 4 inclusive show in transverse section a form of my improved tire under the various degrees of vertical compression indicated in the figures, said drawings being made from actual tire sections or slabs about an inch thick, compressed to the extents indicated; Figs. 5 to 7 inclusive show another form of my tire under the various degrees of compression indicated, these drawings also being made, as described, from slabs; Fig. 8 is a perspective view of a fragment of a similar tire, the view being especially intended to show the longitudinal groove in the tread, the same being deeper than in the other tires, and Fig. 9 shows still another modification of the tire.

The drawings indicate the parts at less than one-half their natural size, the tire of Fig. 1 for touring-car service being about 5" deep between tread and rim. The expression "neutral" used in the figures means that the tire shown in those figures is under no compression;—in other words, is shown in the condition in which it is marketed as an article of manufacture.

I will now describe the tires shown in the drawings as being some of the specific embodiments which my invention is adapted to take. I am not making any claim of novelty herein to the wheel rim and flanges or to the tire-securing and clamping devices, and shall accordingly make only brief mention of these features in the following.

8 is a metal wheel-rim having at one side an outwardly directed convergent flange 9 and at its other side a similar flange 9ᵃ except that it is removably attached to the rim by means of bolts. The rim may have the longitudinal beads shown on its outer side receivable into corresponding grooves shown in the rim side of the tire to coöperate with the clamping devices hereinafter described to hold the tire more securely on the rim.

In the description and claims, I have found it convenient to describe the tire as being in the position shown in the drawings with its tread located under or below the rim side of the tire. Further, it will be understood that the figures merely show transverse sections through the tire, and Fig. 8 a fragment of the entire tire which, it will be understood without saying, extends, like the ordinary tire, in a ring completely around the wheel. An inspection of the three embodiments of my tire shown in Figs. 1, 5 and 9 will show that all of said tires are hollow by means of a longitudinal opening 1 which has a V-shaped transverse section whose base is at the flange-engaged portion 15 of the tire, and whose apex 3 extends toward the tread well below said flange-engaged portion. Said tires further have thick upright side walls 16 at the sides of said opening and a deep nose portion 4 extending across the apex of the opening and across the lower ends of the side walls. The bottom of this nose portion is the tread of the tire and has a wide ground contact delivering the vertical thrusts from the tread well under the side walls 16, consequently, the two deep halves of the nose portion constitute a firm ground-support for the side-walls of the tire.

12 is a longitudinal groove which divides the nose portion upwardly from the tread toward the apex portion of the longitudinal opening, and, as hereinafter explained, relieves said apex from the vertical thrusts from the tread and furthermore, this groove on account of its depth gives lateral flexibility to the nose portion, permitting it to bend in conformity with the road inequalities and other conditions, and thereby largely saves the side walls from bending work which they would otherwise be compelled to do to their detriment and damage. The deeper the groove, the greater is this lateral flexibility, the tire of Fig. 8 having the most flexible nose of all of the tires shown. It will be understood that the two halves of the nose must not be flimsy or collapsible, since it is part of the principle of my tire that they shall constitute firm load supports in continuation of the side-walls 16.

The sides of the tires below the flange-engaged portion and adjacent the longitudinal opening converge steeply toward the tread on substantially straight lines. I prefer a range of inclination to the horizontal for these sides of from 70° to 80° as giving the best effects in coöperation with the other features. The side walls 16 are shown thicker toward the tread than toward the base. For good practice they should be at least as thick toward the tread as toward the base. It will be further noted concerning the longitudinal opening 1 that preferably it is an isosceles triangle in section with its base separated from the rim side of the tire by an overhanging longitudinally split clamping portion 5, by which the tire is clamped to the rim. The securing means shown is a clamping plate 6 (shown in cross section) and a stem 7 adjustably connecting the plate with the rim 8. It will be understood that there may be a plurality of these clamping plates and stems around the rim, and that on taking up on these stems the inwardly directed portions 5 of the tire are clamped by the plates against the rim. It will be noted that this method of clamping permits the thick upright side walls of the tire to consist of unclamped live rubber from the tread to the rim in the best possible condition to have maximum shock-absorbing capacity. Whereas in the tire of Fig. 1, the sides of the tire and of the longitudinal opening are straight, it will be seen that the sides of the modified tires of Figs. 5 and 9 are directed slightly inwardly and consist in Fig. 5 of two pieced-together straight lines 11, and in Fig. 9 of slightly curved lines 10. Also, it will be noted that the sides $10^a$ of the tire opening in Fig. 9 curve slightly inwardly. If anything, the best results in the control of the side walls 16 are obtained when the lines at the sides of the tire are straight, neither curving inwardly nor outwardly, especially so far as those portions of said sides are concerned which extend below the flange-engaged portion of the tire, and are adjacent the longitudinal opening, because it is the free portions of the walls which are inherently weak and which it is the problem to control and properly employ.

An inspection of the compression diagrams beginning with Figs. 1 and 5 respectively will show how perfectly, especially up to 1" compression, has been the control and vertical compression of the side walls, and how naturally the laterally displaced material has filled into the longitudinal opening without bulging the sides of the tire outwardly under the flanges to any injurious extent, and without producing any injurious folds or distortions in the material of the tire, and without changing the general character or appearance of the tire, which is a criterion that its working principle is correct, the wholly compressed figures still having the appearance of the neutral tire. I have said especially up to 1" in the foregoing because the compression diagrams that show the tires compressed more than 1" illustrate abnormal conditions which occur in practice infrequently, the tire handling average loads and shocks at ½" compression, maximum loads and shocks at 1" compression, and having still an all-sufficient reserve capacity beyond this for handling abnormal shocks. The expression "thick" as applied to the side walls, and "deep" as applied to the nose, are of course only relative and are intended to mean that the longitudinal opening is small relative to the sectional outline of the particular tire. Obviously, the actual dimensions of these parts will vary with the size of the tire suited to the weight and nature of the vehicle.

I will now attempt to state briefly the theory of the operation of my tire so far as I know it at this time. The walls 16 project largely below the flange space and consequently are properly responsive to absorb shock. Further, they are thick and upright and therefore not liable to bend and collapse under vertical compression. The bottom of the nose portion 4 extends under and supports these walls 16 and therefore delivers the vertical thrusts from the tread to them in vertical manner without creating bending strains in the walls. The walls 16, while, generally speaking, being upright, nevertheless steeply converge toward the tread so that the thrusts will always be acting endwise on at least one of the side walls in spite of the constant tilting of the tread due to inequalities in the road and in spite of the constant lateral swaying of the vehicle. Finally, the tread groove has the effect of displacing the actual tread contact outwardly from the center toward the sides of the tire so that the thrusts are more directly and exclusively under the side walls. I keep the walls 16 in place by holding them in and by giving their laterally displaced material inward tendency into the sides of the longitudinal opening, because the reverse tendencies soon get beyond control and cause the walls to mush outwardly, to distort, and even break down and collapse. To the end of keeping in the walls 16, each flange-engaged basal portion 15 of the tire constitutes an elbow along with its inwardly directed clamping portion 5 immediately overhanging the base of the triangular longitudinal opening, and along with the downwardly depending side wall 16. These elbows by being supported at their outer corners by the flange and rim and by being clamped at their portions 5, resist any tendency of the side walls 16 to move outwardly. Next, the lower ends of the walls 16 are bound together by the nose piece 4. The walls 16 are substantially straight and converge to form a V pointing toward the thrusts. This is the ideal relation to make the walls 16 receive the thrusts vertically with minimum tendency to bend outwardly. The laterally displaced material is prevented from bulging out detrimentally against or under the flanges by giving it rather the reverse tendency into the longitudinal opening as follows: The sides 2 of the longitudinal opening incline across the vertical thrusts from the tread so that the laterally displaced material naturally compresses into the longitudinal opening by way of its sides. Next, the feature also helps that the longitudinal opening has so small a bottom, which also is shielded from the vertical thrust from the tread by the groove 12. If the longitudinal opening has a broad bottom and the tread thrusts are allowed to act on it, the nose material is forced up into it with resulting vertical compression of the opening and tendency to outward bulging of its side walls 16. Detrimental pressure against and bulging under the flanges is prevented by the features already described, and by the further feature that the sides of the tire below its flange-engaged portions and adjacent the longitudinal opening converge steeply toward the tread, their preferred inclination to the horizontal ranging from 70 to 80 degrees.

Many of the foregoing features contribute to save the side walls 16 from excessive bending work, and this result is largely contributed to by the lateral flexibility of the nose portion 4, due to the tread groove 12, because said nose is able to do much of this work by itself bending and yielding in conformity with the road inequalities and other conditions.

The expression "bending collapse" in the claims means not only an actual collapse but also the tendency toward collapse showing in a buckling or like distortion of the supporting parts of the tire.

What I claim is:

1. A new article of manufacture, a cushion tire which is hollow by means of a longitudinal opening having a V-shaped transverse section whose base is at the flange-engaged portion of the tire and whose apex extends toward the tread well below said flange-engaged portion, said tire having thick upright side walls at the sides of said opening and a deep nose portion extending across the apex of said opening and across the lower ends of said walls, said nose portion having a bottom with a wide ground-contact delivering the vertical thrusts from the tread well under said side walls, said nose having portions removed therefrom extending deeply up into it from the tread which weaken it under the apex portion of the V-shaped opening and give it lateral flexibility under the side walls of the tire.

2. A new article of manufacture, a cushion tire which is hollow by means of a longitudinal opening having a V-shaped transverse section whose base is at the flange-engaged portion of the tire and whose apex extends toward the tread well below said flange-engaged portion, said tire having thick upright side walls at the sides of said opening and a deep nose portion extending across the apex of said opening and across the lower ends of said walls, said nose portion having a bottom with a wide ground-contact delivering the vertical thrusts from the tread well under said side walls, said nose having portions removed therefrom extending deeply up into it from the tread which weaken it under the apex portion of the V-shaped opening and give it lateral flexibility under the side walls of the tire, said tire having its sides below its flange-engaged portion and adjacent the longitudinal opening steeply converging toward the tread on substantially straight lines.

3. A new article of manufacture, a cushion tire which is hollow by means of a longitudinal opening having a V-shaped transverse section whose base is at the flange-engaged portion of the tire and whose apex extends toward the tread well below said flange-engaged portion, said tire having thick upright side walls at the sides of said opening and a deep nose portion extending across the apex of said opening and across the lower ends of said walls, said nose portion having a bottom with a wide ground-contact delivering the vertical thrusts from the tread well under said side walls, said nose having portions removed therefrom extending deeply up into it from the tread which weaken it under the apex portion of the V-shaped opening and give it lateral flexibility under the side walls of the tire, said tire having its sides below its flange-engaged portion and adjacent the longitudinal opening steeply converging toward the tread on substantially straight lines, said side walls being thicker toward the tread than toward the base of the tire.

4. A new article of manufacture, a cushion tire whose transverse section consists of two parts, an upper and a lower, the former being engaged by the wheel flanges and the latter being free of said flanges, the shape of the lower part being substantially trapezoidal with its inclined sides converging steeply toward the tread, said tire being hollow by means of a longitudinal opening having a small V-shaped transverse section whose base is at the flange-engaged part of the tire and whose apex extends well into the lower part of the tire, said tire having side walls comprised between the sides of said opening and the sides of the tire, and having a nose portion between the apex of the opening and the tread of the tire, said nose having portions removed therefrom extending deeply up into it from the tread which weaken it under the apex portion of the V-shaped opening and give it lateral flexibility under the side walls of the tire.

5. A new article of manufacture, a cushion tire whose transverse section consists of two parts, an upper and a lower, the former being engaged by the wheel flanges and the latter being free of said flanges, the shape of the lower part being substantially trapezoidal with its inclined sides converging steeply toward the tread at an angle to the horizontal of from 70 to 80 degrees, said tire being hollow by means of a longitudinal opening having a small V-shaped transverse section whose base is at the flange-engaged part of the tire and whose apex extends well into the lower part of the tire, said tire having side walls comprised between the sides of said opening and the sides of the tire, and having a nose portion between the apex of the opening and the tread of the tire, said nose having portions removed therefrom extending deeply up into it from the tread which weaken it under the apex portion of the V-shaped opening and give it lateral flexibility under the side walls of the tire, said side walls being thicker toward the tread than toward the base of the tire.

6. A new article of manufacture, a cushion tire which is hollow by means of a longitudinal opening having a V-shaped transverse section whose base is at the flange-engaged portion of the tire and whose apex extends toward the tread well below said flange-engaged portion, said tire having thick upright side walls at the sides of said opening and a deep nose portion extending across the apex of said opening and across the lower ends of said walls, said nose portion having a bottom with a wide ground-contact delivering the vertical thrusts from the tread well under said side walls.

7. A new article of manufacture, a hollow cushion tire comprising a flange-engaged base-portion, flange-free thick, substantially straight side-walls, containing the hollow of the tire between them and converging steeply from said base-portion toward each other, and a deep nose portion extending across the lower ends of said walls, said nose portion having a bottom with a wide ground-contact delivering the vertical thrusts from the tread well under said side-walls, said nose being laterally flexible under said walls by being longitudinally weakened from the tread under the hollow of the tire.

8. A hollow cushion tire comprising the combination of flange-free, thick, substantially straight side walls which steeply converge toward the tread inclosing between them the longitudinally extending tire-hollow of a small triangular cross section, said combination further comprising a wide, deep, substantial nose portion extending across the hollow of the tire in firm supporting ground-contact under said walls, the side-portions of said tire from tread to rim supporting the load by their vertical compression with accompanying thickening but without bending collapse, and the outline of the compressed tire remaining substantially like the uncompressed tire.

9. A hollow cushion tire comprising the combination of flange-free, thick, substantially straight side walls which steeply converge toward the tread inclosing between them the longitudinally extending tire-hollow of a small triangular cross section, said combination further comprising a wide, deep, substantial nose portion extending across the hollow of the tire in firm supporting ground-contact under said walls, the side-portions of said tire from tread to rim supporting the load by their vertical compression with accompanying thickening but without bending collapse, and the outline of the compressed tire remaining substantially like the uncompressed tire, said nose being deeply weakened from the tread giving deep flexibility to its supporting portions beneath the side walls.

10. A new article of manufacture, a cushion tire which is hollow by means of a longitudinal opening having a V-shaped transverse section whose base is at the flange-engaged portion of the tire and whose apex extends toward the tread well below said flange-engaged portion, said tire having thick upright side walls at the sides of said opening and a deep nose portion extending across the apex of said opening and across the lower ends of said walls, said nose portion having a bottom with a wide ground-contact delivering the vertical thrusts from the tread well under said side walls, said tire having its outer sides below its flange-engaged portion and adjacent the longitudinal opening steeply converging toward the tread in substantially straight lines.

11. A new article of manufacture, a cushion tire which is hollow by means of a longitudinal opening having a V-shaped transverse section whose base is at the flange-engaged portion of the tire and whose apex extends toward the tread well below said flange-engaged portion, said tire having thick upright side walls at the sides of said opening and a deep nose portion extending across the apex of said opening and across the lower ends of said walls, said nose portion having a bottom with a wide ground-contact delivering the vertical thrusts from the tread well under said side walls, said tire having its outer sides below its flange-engaged portion and adjacent the longitudinal opening steeply converging toward the tread in substantially straight lines at an angle to the horizontal of from 70 to 80 degrees, and the inclination of the sides of the V-shaped opening not being steeper than said outer sides.

12. A new article of manufacture, a cushion tire which is hollow by means of a longitudinal opening having a V-shaped transverse section whose base is at the flange-engaged portion of the tire and whose apex extends toward the tread well below said flange-engaged portion, said tire having thick upright side walls at the sides of said opening and a deep nose portion extending across the apex of said opening and across the lower ends of said walls, said nose portion having a bottom with a wide ground-contact delivering the vertical thrusts from the tread well under said side walls, said nose portion being deeply weakened from the tread giving deep flexibility thereto beneath the side walls.

In testimony whereof I affix my signature in presence of two witnesses.

MAX CYRUS OVERMAN.

Witnesses:
  ALAN C. MCDONNELL,
  E. W. SCHERR, Jr.